(12) United States Patent
Mraz et al.

(10) Patent No.: US 8,732,453 B2
(45) Date of Patent: May 20, 2014

(54) SECURE ACKNOWLEDGMENT DEVICE FOR ONE-WAY DATA TRANSFER SYSTEM

(75) Inventors: Ronald Mraz, South Salem, NY (US); James Hope, Greenwich, CT (US); Jeffrey Menoher, Ridgefield, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 406 days.

(21) Appl. No.: 13/183,208

(22) Filed: Jul. 14, 2011

(65) Prior Publication Data

US 2012/0017079 A1    Jan. 19, 2012

Related U.S. Application Data

(60) Provisional application No. 61/365,625, filed on Jul. 19, 2010.

(51) Int. Cl.
*H04L 29/06* (2006.01)
(52) U.S. Cl.
USPC .......................................... 713/153; 713/150
(58) Field of Classification Search
USPC .......................... 713/150–181; 709/204–207; 370/254–257
See application file for complete search history.

(56) References Cited

U.S. PATENT DOCUMENTS

| | | | |
|---|---|---|---|
| 4,672,601 A | 6/1987 | Ablay | |
| 5,282,200 A | 1/1994 | Dempsey et al. | |
| 5,703,562 A | 12/1997 | Nilsen | |
| 5,769,527 A | 6/1998 | Taylor et al. | |
| 5,983,332 A | 11/1999 | Watkins | |
| 6,108,787 A | 8/2000 | Anderson et al. | |
| 6,262,993 B1 | 7/2001 | Kimse | |
| 6,415,329 B1 | 7/2002 | Gelman et al. | |
| 6,477,578 B1 | 11/2002 | Mhoon | |
| 6,546,422 B1 | 4/2003 | Isoyama et al. | |

(Continued)

FOREIGN PATENT DOCUMENTS

| WO | 8404435 A1 | 11/1984 |
|---|---|---|
| WO | 2004105297 A2 | 12/2004 |

OTHER PUBLICATIONS

M. Anderson, C. North, J. Griffin, R. Milner, J. Yesberg, K. Yiu, "Starlight: Interactive Link," 1996, Defence Science & Technology Organization, Salisbury, South Australia, Australia.

(Continued)

*Primary Examiner* — Andrew Nalven
*Assistant Examiner* — Khang Do
(74) *Attorney, Agent, or Firm* — Amster, Rothstein & Ebenstein LLP

(57) ABSTRACT

An apparatus for relaying a hashed message from a first node to a second node, comprising an inlet interface for receiving a message from the first node, a hash number calculator for hashing the message from the inlet interface, an outlet interface for sending the hashed message to the second node, a first one-way data link for unidirectional transfer from the inlet interface to the hash number calculator, and a second one-way data link for unidirectional transfer from the hash number calculator to the outlet interface, is provided. The apparatus provides a secure mechanism and communication channel for relaying hashed acknowledgment messages from a receive node to a send node to inform the status of data transfer from the send node to the receive node across a one-way data link. The apparatus may be further implemented with the capability of comparing hashed messages from the two nodes.

50 Claims, 7 Drawing Sheets

(56) References Cited

U.S. PATENT DOCUMENTS

| | | |
|---|---|---|
| 6,665,268 B1 | 12/2003 | Sato et al. |
| 6,728,213 B1 | 4/2004 | Tzeng et al. |
| 7,095,739 B2 | 8/2006 | Mamillapalli et al. |
| 7,246,156 B2 | 7/2007 | Ginter et al. |
| 7,260,833 B1 | 8/2007 | Schaeffer |
| 7,339,929 B2 | 3/2008 | Zelig et al. |
| 7,356,581 B2 | 4/2008 | Hashimoto |
| 7,370,025 B1 | 5/2008 | Pandit |
| 7,529,943 B1 | 5/2009 | Beser |
| 7,675,867 B1 | 3/2010 | Mraz et al. |
| 7,966,492 B1 * | 6/2011 | Gasparini et al. ............ 713/170 |
| 2002/0003640 A1 | 1/2002 | Trezza |
| 2002/0007453 A1 | 1/2002 | Nemovicher |
| 2002/0118671 A1 | 8/2002 | Staples et al. |
| 2002/0178271 A1 | 11/2002 | Graham et al. |
| 2003/0058810 A1 | 3/2003 | Petronic |
| 2003/0119568 A1 | 6/2003 | Menard |
| 2003/0195932 A1 | 10/2003 | Tanabe et al. |
| 2003/0229780 A1 | 12/2003 | Reamer |
| 2004/0103199 A1 | 5/2004 | Chao et al. |
| 2004/0103279 A1 | 5/2004 | Alten |
| 2004/0236874 A1 | 11/2004 | Largman et al. |
| 2005/0033990 A1 | 2/2005 | Harvey et al. |
| 2005/0132196 A1 | 6/2005 | Dietl |
| 2005/0136884 A1 * | 6/2005 | Reidelsturz et al. ......... 455/403 |
| 2005/0149732 A1 | 7/2005 | Freeman et al. |
| 2005/0182937 A1 | 8/2005 | Bedi |
| 2005/0201373 A1 | 9/2005 | Shimazu et al. |
| 2005/0259587 A1 | 11/2005 | Wakumoto et al. |
| 2006/0036857 A1 * | 2/2006 | Hwang ........................ 713/168 |
| 2006/0114566 A1 | 6/2006 | Ohmori et al. |
| 2006/0153092 A1 | 7/2006 | Matilyahu et al. |
| 2006/0153110 A1 | 7/2006 | Morgan et al. |
| 2006/0156400 A1 * | 7/2006 | Shevchenko ................... 726/22 |
| 2006/0173850 A1 | 8/2006 | Auer et al. |
| 2006/0190533 A1 * | 8/2006 | Shannon et al. .............. 709/203 |
| 2006/0209719 A1 | 9/2006 | Previdi et al. |
| 2006/0248195 A1 | 11/2006 | Toumura et al. |
| 2007/0223158 A1 | 9/2007 | Ma et al. |
| 2008/0259929 A1 * | 10/2008 | Mraz ......................... 370/395.1 |
| 2008/0310631 A1 * | 12/2008 | Lott .............................. 380/255 |
| 2009/0013111 A1 | 1/2009 | Berland et al. |
| 2009/0024612 A1 | 1/2009 | Tang et al. |
| 2010/0161817 A1 | 6/2010 | Xiao et al. |
| 2010/0268957 A1 * | 10/2010 | Suzuki et al. ................. 713/176 |

OTHER PUBLICATIONS

"Interactive Link White Paper," Jul. 27, 2001, Tenix Defence Pty Ltd., Mawson Lakes, South Australia, Australia.

"Veto Uni-directional Network Bridge and Data Pump Applications White Paper," UNB and DPA White Paper by Tenix Datagate Pty Ltd, 2002, pp. 1-6.

Westmacott, J., "Unidirectional Networking: GIAC Security Essential Certification Practical Assignment Version 1.46", SANS Institute, 2003.

International Search Report corresponding to International Application No. PCT/US11/44052 mailed Dec. 6, 2011.

Written Opinion corresponding to International Application No. PCT/US11/44052 mailed Dec. 6, 2011.

\* cited by examiner

SECURE ACKNOWLEDGMENT DEVICE FOR ONE-WAY DATA TRANSFER SYSTEM

CROSS-REFERENCE TO RELATED APPLICATION

This U.S. non-provisional patent application claims priority from U.S. provisional patent application Ser. No. 61/365,625 filed on Jul. 19, 2010, the content of which is incorporated herein by reference in its entirety.

FIELD OF THE INVENTION

The present invention generally relates to the security of data networks. More particularly, the present invention relates to a secure communication device for relaying acknowledgment messages in a one-way data transfer system.

BACKGROUND

Protection of a computer or data network from undesired and unauthorized data disclosure has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, the conventional network security devices such as firewalls may not provide sufficiently reliable protection from undesired data disclosure.

Alternative network security methods and devices have been devised to address the network security concern. For example, U.S. Pat. No. 5,703,562 to Nilsen ("the '562 patent"), the contents of which are hereby incorporated by reference in their entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links, including Dual Diode developed and marketed by Owl Computing Technologies, Inc., provide network security to data networks by isolating the networks from potential security breaches (i.e., undesired and unauthorized data flow out of the secure network) while still allowing them to import data from the external source in a controlled fashion. FIG. 1 schematically illustrates an example of one such Dual Diode one-way data transfer system. In the one-way data transfer system shown in FIG. 1, two computing platforms (or nodes) 1 and 2 (respectively, "the Send Node" and "the Receive Node") are connected to the unsecured external network 4 ("the source network") and the secure network 5 ("the destination network"), respectively. The Send Node is connected to the Receive Node by one-way data link 3, which may comprise, for example, a high-bandwidth optical fiber configured to operate as a unidirectional data gateway from the source network 4 to the secure destination network 5.

The one-way data transfer system described above may further comprise two specially configured Asynchronous Transfer Mode (ATM) network interface cards installed respectively in the Send Node and the Receive Node and respectively coupled to the ends of the high-bandwidth optical fiber. The interface card in the Send Node may be equipped only with components for phototransmission and the card in the Receive Node may be equipped only with components for photodetection, so that unidirectionality of data flow from the Send Node to the Receive Node across the optical fiber is physically enforced.

This configuration physically enforces one-way data transfer at both ends of the optical fiber connecting the Send Node to the Receive Node, thereby creating a truly unidirectional one-way data link between the source network 4 and the destination network 5 shown in FIG. 1. Unlike conventional firewalls, one-way data transfer systems such as Dual Diode based on a one-way data link are designed to transfer data or information only in one direction and it is physically impossible to transfer data or information of any kind in the reverse direction. No information or data of any kind, including handshaking messages such as those used in TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

There exist other types of one-way data links that are capable of enforcing unidirectional data flow. For example, IP (Internet Protocol) architecture using standard firewalls or routers can be specially configured in various ways to enforce unidirectional data flow between two network domains or nodes. One example of such one-way data link is specially configured IP architecture that uses standard firewalls to enforce unidirectional flow of UDP (User Datagram Protocol) data packets between two network security domains corresponding to Send Node and Receive Node. In that configuration, a Receive Node may be protected by a standard firewall which is designed to accept only UDP data packets and deny all other service requests. Furthermore, a pair of additional firewalls that are joined back to back and positioned between the Send Node and the Receive Node may form a network guard capable of enforcing unidirectional flow of UDP data packets from the Send Node to the Receive Node. Preferably, this network guard is administered separately.

The unidirectionality of data flow in such configuration can be achieved as follows: The first firewall of the network guard which interfaces with the Send Node (which may also be protected by its own standard firewall) is designed to accept only UDP data packets from the Send Node and deny all other service requests from the Send Node. The second firewall of the network guard which interfaces with the firewall associated with the Receive Node is designed to deny all incoming service requests or data flow from the Receive Node. In this manner, the specially configured IP architecture based on standard firewalls may permit only unidirectional flow of UDP data packets from the Send Node to the Receive Node and denies any data flow from the Receive Node to the Send Node.

While a one-way data link provides excellent protection for data residing in the secure network as described above, its use raises a dilemma concerning data verification and data receipt acknowledgment capability which is critical in any data transfer system: In a one-way data transfer system based on a one-way data link, in the absence of any acknowledgment signal or message from the Receive Node, the Send Node cannot verify from the Receive Node the status and integrity of the data it sent to the Receive Node without giving up the unidirectionality of data flow and thereby compromising the security provided by use of one-way data links.

The conventional implementation of data verification schemes requires a way for the Receive Node to communicate to the Send Node information regarding the status and integrity of the data received by the Receive Node from the Send Node. This can be easily implemented in bi-directional communication environment. However, since a one-way data link allows only unidirectional communications from the Send Node to the Receive Node, a one-way data transfer system based solely on a one-way data link between the Send Node and the Receive Node cannot implement the data verification schemes without giving up the unidirectionality of data flow in the system.

The '562 patent addresses data verification for one-way data transfer systems based on a one-way data link by providing a "warning device" coupled to the secured computer that "emits" a "warning signal" when the secured computer detects error in data transmission over the one-way data link. As an example, the '562 patent suggests the use of "a single long duration tone" as the warning signal for error detection. (The '562 patent, Col. 4, lines 20-29, and FIG. 1.) However, while the '562 patent discloses that parity or checksum calculations or other conventional error detection calculations may be performed to detect any errors introduced during the repeated data transfer, it does not disclose or suggest any means for transmitting the result of such error detection calculations by the Receive Node to the Send Node so that the Send Node can compare the results and deduce the status and integrity of the transferred data from the comparison. Accordingly, the warning device as described in the '562 patent is not capable of maximally utilizing modern data verification schemes such as advanced hash algorithms.

This dilemma concerning data verification for one-way data transfer system based on a one-way data link is addressed by U.S. Pat. No. 7,675,867 to Mraz et al. ("the '867 patent"), the contents of which are hereby incorporated by reference in their entirety. The '867 patent is directed to a one-way data transfer system with built-in data verification mechanism that is capable of maximally utilizing the power and benefits of the modern data verification schemes without compromising the level of security afforded by the use of one-way data links. Illustrated in FIG. 2 is a schematic diagram of an exemplary one-way data transfer system with built-in verification mechanism described in the '867 patent. The system 20 comprises a Send Node 21 coupled to the source network through a connection 24, a Receive Node 22 coupled to the destination network through a connection 25, and a Feedback Node 27. The Send Node 21 is connected to the Receive Node 22 by a one-way data link 23, the Receive Node 22 is connected to the Feedback Node 27 by a one-way data link 26, and the Feedback Node 27 is connected to the Send Node 21 by a one-way data link 28. As indicated by the arrow-bar symbols (only intended to symbolize the unidirectionality of data flow) in FIG. 2, the system 20 is designed to only allow unidirectional data flow from the Send Node to the Receive Node, from the Receive Node to the Feedback Node, and from the Feedback Node to the Send Node. This configuration described in the '867 patent allows no direct bilateral communication between any two of the Nodes.

One-way data links 23, 26, 28 used in the system 20 can be of any types of data transfer conduit that are capable of enforcing unidirectional data flow. For example, each of the one-way data links 23, 26, 28 may be implemented in hardware and comprise high-bandwidth optical fiber whose both ends are respectively coupled to two specially configured ATM network interface cards for enforcing unidirectional optical data flow as described earlier in connection with the Dual Diode product. Alternatively, one-way data links used in the system 20 may be implemented in software and comprise the specially configured IP architecture that use standard firewalls to enforce unidirectional transfer of, for example, UDP data packets, as described earlier. Alternatively, a combination of different types of one-way data link may be used in the system 20.

In FIG. 2, the Send Node 21 and the Receive Node 22 provide the main data transfer conduit from the source network via connection 24 across the one-way data link 23 to the destination network via connection 25. Thus, these Nodes may comprise high-throughput computing platforms capable of carrying out the data transfer.

On the other hand, the third node in the system 20, Feedback Node 27, can be a special-purpose machine or device that is designed solely for processing and relaying data verification information from the Receive Node 25 to the Send Node 21, all via one-way data links 26 and 28. Accordingly, the Feedback Node 27 may comprise a minimum capacity machine incapable of transferring any data or information other than specifically designated data verification information from the Receive Node 22 to the Send Node 21.

The Feedback Node 27 may be designed to be user-configurable. In other words, it can be configured by the user to explicitly limit and adjust the channel capacity of the feedback channel through the Feedback Node 27, and thus limit the channel capacity of the only covert channel data path available in the one-way data transfer system. This capability for users to configure the security characteristics of the one-way data transfer system to match their security requirements can be a powerful feature. Whatever the settings for the channel capacity of the Feedback Node 27, it would be necessary to configure the Send Node 21 in a complementary manner to avoid timeout problems which may occur, for instance, when the Send Node 21 issues a feedback verification request.

The data verification information used in the system 20 may be generated by advanced hash algorithm. The hash algorithm is a type of the modern data verification schemes and widely-used hash algorithms include MD5 and the Secure Hash Algorithm (SHA) such as SHA-1. Before describing the possible use of hash algorithms in the system 20, further description of the application of hash algorithms in the context of bilateral communications and one-way data transfer between the Send Node and the Receive Node are in order.

One possible implementation of the data verification scheme using hash algorithm in the context of bilateral communications between the Receive Node and the Send Node can be described as follows: When transferring data packets to the Receive Node, the Send Node applies the hash algorithm to the contents of each data packet and calculates a corresponding "hash" number (i.e., the data is "hashed") and transmits it to the Receive Node along with the data packets. Upon receipt of the data packets from the Send Node, the Receive Node also calculates the hash numbers corresponding to the received data packets and compares them with the hash numbers calculated by the Send Node. If the hash numbers calculated by both Nodes match, then there is no error in the data transfer. However, if the hash numbers do not match, then the Receive Node may drop the data packets it has received and log an error in the data transfer and communicates the error message to the Send Node. Typically, the error message comprises the hash number calculated by the Receive Node so that the Send Node can compare it with the hash number which the Send Node originally calculated and deduce the status and integrity of the transferred data from the result of the comparison.

Advanced hash algorithms may also be used to verify data integrity during one-way data transfer between the Send Node and the Receive Node in the following manner: A Send Node calculates a hash number corresponding to the contents of data or a data packet to be transferred to a Receive Node. The Send Node then transfers the hash number along with the data. Upon receipt of the data and the hash number from the Send Node, the Receive Node calculates on its own a hash number corresponding to the contents of the data or data packet it received. In each case, the hash algorithm generates a unique hash number corresponding to the data or data packet upon which the algorithm is applied. Accordingly, if the hash number calculated by the Receive Node matches with the hash number originally calculated by the Send Node, then there is no error in the data transfer from the Send Node to the Receive Node since the match indicates that the data received by the Receive Node is identical to the data sent by the Send Node. However, if these two hash numbers do not match, there must have been an error in the data transfer and accordingly, the Receive Node logs an error and may drop the data it received from the Send Node.

The data verification scheme based on advanced hash algorithms may be implemented in the system 20 shown in FIG. 2 as follows: The Send Node 21 first calculates a hash number corresponding to the data to be transferred to the Receive Node 22 ("Hash Number 1"). The Send Node additionally calculates a hash number corresponding to the foregoing hash number ("Hash Number 2").

Upon receipt of the data across a one-way data link 23, the Receive Node 22 calculates a hash number corresponding to the data it received ("Hash Number 3"). The Receive Node 22 may also be designed to further receive Hash Number 1 calculated by the Send Node 21 based on the sent data and compare it with Hash Number 3. The matching of these two Hash Numbers indicates that there is no error in the one-way data transfer across the one-way data link 23. On the other hand, if these two Hash Numbers do not match, the Receive Node 22 becomes aware of the existence of an error in the one-way data transfer and may drop the data it received from the Send Node 21 and logs an error.

The Receive Node transmits Hash Number 3 to the Feedback Node 27 over a one-way data link 26. The Feedback Node 27 may be designed solely for processing hash numbers transmitted from the Receive Node 22 and then transmitting the results to the Send Node 21 over a one-way data link 28. For example, the Feedback Node 27 (in this example, it may be called the "Hash Feedback Node") may be designed solely for calculating a hash number corresponding to Hash Number 3 from the Receive Node 22 ("Hash Number 4") and transmit it to the Send Node 21.

Upon receipt of Hash Number 4 from the Feedback Node 27, the Send Node 21 compares Hash Number 4 with the Hash Number 2 it calculated prior to the data transfer to verify the status of the data it transferred to the Send Node 22. If Hash Number 2=Hash Number 4, the Send Node 21 deduces that the data received by the Receive Node 22 is identical to the data sent by the Send Node 21. On the other hand, if these Hash Numbers do not match, the Send Node 21 deduces that there must have been one or more errors in the data transfer across the one-way data link 23. In this manner, the Send Node 21 is capable of verifying the status of the data transferred to the Receive Node 22 with the help of the Feedback Node 27, without sacrificing the unidirectionality of data flow in the system 20 and the level of network security provided by it.

Other possible implementations of the system 20 shown in FIG. 2 are explained with the help of functional block diagrams shown in FIGS. 3 and 4. FIG. 3 is a functional block diagram for primary data flow for the embodiment of the present invention shown in FIG. 2. FIG. 3 shows the primary data flow from the source network through connection 34 to the Send Node 21 and to the Receive Node 22 across a one-way data link 33 and to the destination network through connection 35. During the primary data flow, the one-way data links 36 and 38 to and from the Feedback Node 27 may remain inactive.

During the primary data flow, the Send Node 21 may receive data in arbitrary form from the source network across connection 34. Send Node 21 may then encapsulate the data it receives (preferably in the order in which the data is received) for transfer to the Receive Node 22 across one-way data link 33. Encapsulated portions of data, which may be considered packets of proprietary structure, may be assigned with numbers for identification. These data packets may be grouped according to sessions, which are also assigned with identification numbers. The Send Node 21 may maintain a record of the packets it sent and the sessions to which they belong. The Send node 21 may also maintain a record of the status of its operational health. Such status may include presence or absence of errors in data transfer. The Receive Node 22 also maintains a record of the packets received and the sessions to which they belong. The Receive node 22 also maintains a record of the status of its operational health.

The data involved in the primary data flow may comprise one or more data packets or data files. Some examples of the types of data that may be involved in the primary data flow in FIG. 3 include: one or more files in the Send Node 21, UDP (User Datagram Protocol) packets received from the source network 24, TCP (Transmission Control Protocol) packets received and acknowledged by connection to the source network 24, and IP (Internet Protocol) packets received and acknowledged by connection to the source network 24. The data may also include header information or header bits containing information regarding the data such as file name, byte count, time stamp, and status bits. The status bits may comprise a limited number of pre-assigned status or error codes that may respectively indicate, for example, "no error," "file system full," "lost data packet," "unknown error," etc. The status bits may also contain non-error-related information, indicating, for example, "everything is okay, so the data transfer should be speeded up," or "everything is okay, but the data transfer should be speeded down since the node is really busy."

The Send Node 21 calculates and may store a hash number corresponding to the data to be transferred to the Receive Node 22, including the header information of the data. The Send Node 21 may be designed to further transmit this hash number to the Receive Node 22 along with the data. The Send Node 21 then further calculates and may store another hash number corresponding to the foregoing hash number (i.e., the data is "doubly hashed"). In addition, the Send Node 21 may have a table of all possible results from doubly hashing all possible status bits of the header information (i.e., hash numbers corresponding to all possible hash numbers, which in turn correspond to all possible status and error codes in the status bits for the data to be transferred).

FIG. 4 shows the feedback data flow for data verification purpose. The feedback data flow for data verification may be triggered automatically upon every instance of primary data flow across the one-way data link 33 shown in FIG. 3. Alternatively, the feedback data flow for data verification may be triggered by verification requests by the Send Node 21 to the Receive Node 22 over the one-way data link 43. The verification requests by the Send Node 21 may be designed to be made at predetermined periodic intervals. Furthermore, data verification may be done for one-way data transfer on a packet by packet basis, file by file basis, or according to any suitable desired schedule. During the feedback data flow for data verification, the connections 44 and 45 to the source network and the destination network may remain inactive.

Either before or after receiving the verification request from the Send Node 21 across the one-way data link 43, the Receive Node 22 calculates a hash number corresponding to the data it received from the Send Node 21 across the one-way data link 33. The Receive Node 22 may be designed to further compare this hash number with the hash number calculated by and received from the Send Node 21, which corresponds to the original data sent by the Send Node 21. Based on the comparison, the Receive Node 22 may determine the status of the received data and updates the status bits in the header information by setting up those bits corresponding to the appropriate status or error codes.

For example, if those two hash numbers match and therefore there is no error in the one-way data transfer across the one-way data link 33, then the Receive Node 22 sets the status code for "no error" to be non-zero (i.e., "1") and sets other error codes to be zero. If the two hash numbers do not match, then this non-match indicates that there may be one or more errors in the one-way data transfer across the one-way data link 33. Upon detecting the existence of one or more errors, the Receive Node 22 sets all the corresponding status and error bits to be non-zero. The status bits may be designed to indicate more than one error. If there are multiple errors in the one-way data transfer, then the multiple bits embedded in the status bits corresponding to all the applicable predefined error codes may be toggled to non-zero by the Receive Node 22.

The status bits may also be designed to indicate an error that is not directly related to the one-way data transfer. For example, if the data storage for the Receive Node 22 is full, then the Receive Node 22 will not be able to store and further process the data received from the Send Node 21 even if the received data does not contain any error or corruption. In this case, the Receive Node 22 may update the status bits to indicate a "disk full" or "file system full" error.

The Receive Node 22 may also calculate a hash number corresponding to this updated status and error bits. Upon encountering an error in the one-way data transfer, the Receive Node 22 may abort further processing of the data received from the Send Node 21, drop it, perform any necessary cleanup operations, and then wait for receipt of new data from the Send Node 21.

Upon receiving the verification request from the Send Node 21 across the one-way data link 43, the Receive Node 22 transmits the hash number corresponding to the received data across a one-way data link 46 to the Feedback Node 27. The Receive Node 22 may also transmit the hash number corresponding to the status and error bits it updated to the Feedback Node 27 across the one-way data link 46. The Feedback Node 27 is designed solely for processing hash numbers from the Receive Node 22 and transmitting the results to the Send Node 21. Accordingly, the only type of data transmitted from the Receive Node 22 to the Feedback Node 27 and from the Feedback Node 27 to the Send Node 21 is hash numbers such as MD5 or SHA-1 digests. The Feedback Node 27 then calculates hash number(s) corresponding to the hash number(s) received from the Receive Node 22 (i.e., doubly hashed status bits), and transmits the results to the Send Node 21 over a one-way data link 48.

Upon receipt of hash number(s) from the Feedback Node 27, the Send Node 21 may verify the status of the data sent to the Receive Node 22 across the one-way data link 33 by comparing the doubly hashed sent data it calculated and stored as described earlier with the doubly hashed received data from the Feedback Node 27. If those two hash numbers do not match, then the Send Node 21 may become aware of the existence of an error in the one-way data transfer to the Receive Node 22.

Additionally or alternatively, the Send Node 21 can also verify the status of the data transferred to the Receive Node 22 across the one-way data link 33 by comparing the value of the doubly hashed status bits from the Feedback Node 27 with the expected values known by the Send Node 21. As described earlier, the Send Node 21 may already know all possible expected values of doubly hashed status bits, based on which the Send Node 21 may generate and maintain a table of all the expected values. In this way, if an error has occurred, not only can the Send Node 21 detect the existence of an error in the one-way data transfer, but it can also identify the type of error in the one-way data transfer by identifying the error code in the status bits. However, if there is no match between the hash number from the Feedback Node 27 and any of the known expected values of the doubly hashed status bits, the Send Node 21 may determine that some unknown error must have occurred in the one-way data transfer to the Receive Node 22.

In an alternative configuration, instead of knowing in advance all possible values of doubly hashed status bits, the Send Node 21 may examine and compare bit by bit the doubly hashed status bits from the Feedback Node 27 as follows: The Send Node 21 turns on (i.e., sets to be non-zero) the leftmost bit in the status bits field in the header information, calculates its expected doubly hashed value, and compares it to the value of the doubly hashed status bits received from the Feedback Node 27. If both hash numbers match, then the error that occurred corresponds to the single bit that is turned on in the status bits. If these two hash numbers do not match, then the error bit is rotated right to the next bit position of the status bits field and the double hash number calculations and comparisons are repeated until either a match occurs, or all defined positions in the status bits have been examined and exhausted. If all bit positions corresponding to errors have been rotated through without any match between the hash number calculated by the Send Node 21 and the hash number received from the Feedback Node 27, then some unknown error has occurred and the one-way data transfer process may be terminated by the Send Node 21.

The functional diagram in FIG. 5 uses flow charts to describe another way to implement the system 20 shown in FIG. 2. As shown in FIG. 5, the Send Node 107 transfers data 100 with its existing headers and check bits to the Receive Node 108 via a one-way data link 116. The Send Node 107 maintains status information 101. In addition to carrying ubiquitous information, data 100 may also indicate Start of Message (SOM) or End of Message (EOM). The status information 101 may include a running digest of previously accumulated hash information, current packet number, session number, or other information.

The Receive Node 108 receives data 105 from the Send Node 107 which may or may not contain errors introduced during the one-way transfer. The received data 105 may or may not be identical to the sent data 100. The Receive Node 108 also determines its own status and maintains status information 113.

At some predefined time interval, or at any time when deemed necessary, the Send Node 107 initiates a verification request process 112. During the verification request process, the sent data 100, which may contain an SOM or an EOM indicator or any other information, is designated as a Feedback Verification Request Message 117 and sent to the Receive Node 108. The Feedback Verification Request Message 117 may be structurally identical to the previously sent data-bearing message 116, and may be identified by a single toggled bit in the data header.

Upon receipt of the Feedback Verification Request Message 117, the Receive Node 108 initiates a verification response process 114. The verification response process in the Receive Node 108 uses the status information 113 determined and maintained by the Receive Node 108 and the status information embedded in the Feedback Verification Request Message 117 from the Send Node 107 to render its own status report 119. The status information embedded in the Feedback Verification Request Message 117 may include information relating to time stamp, packet number and session number, and may contain some portion of the status information 101 generated by the Send Node 107. Alternatively, the status information embedded in the Feedback Verification Request Message 117 may be identical to the status information 101 generated by the Send Node 107.

The status report 119 in the Receive Node 108 may contain up to 64 individual binary status indicators which may be used singly or concurrently, and includes the communication status on Receive Node 108 and known data items. The status report 119 may include time stamp information which can be used to perform data throughput calculation in real time. Such calculations may be used to measure the operational health of the overall system, including detection of instances of "operating system interference." The Receive Node 108 uses status report 119 to create a hash number 106. The hash number 106 may be generated by a single 16 byte MD5 hash calculation. The Receive Node 108 then passes the hash number 106 to the Hash Feedback Node 109 via a one-way data link 120.

Upon receipt of the hash number 110 (also labeled hash number 106 in the Receive Node 108) via the one-way data link 120 from the Receive Node 108, the Hash Feedback Node 109 rehashes the hash number 110 to create double hash number 111. The Hash Feedback Node 109 then sends this double hash number 111 to the Send Node 107 via a one-way data link 119.

Upon receipt of the double hash number 104 (also labeled double hash number 111 in the Hash Feedback Node 109) via the one-way data link 119 from the Hash Feedback Node 109, the Send Node 107 initiates a hash comparison 115. During the hash comparison 115, the Send Node 107 renders the status information 101 retained in the Send Node 107 into a status report 118. The status report 118 may contain up to 64 individual binary status indicators which may be used singly or concurrently. Like the status report 119 in the Receive Node 108, the status report 118 may include time stamp information which can be used to perform data throughput calculation in real time. Such calculations may be used to measure the operational health of the overall system, including detection of instances of "operating system interference."

The Send Node 107 uses the status report 118 to create a hash number 102, which is hashed again in the Send Node 107 to generate a double hash number 103. The hash number 102 may be generated by a single 16 byte MD5 hash calculation. Likewise, the double hash number 103 may be the result of the same 16 byte MD5 hash calculation applied to the hash number 102. The hash comparison 115 compares the two double hash numbers 104 and 103. When these two double hash numbers 104 and 103 match, the state is known (i.e., no error in the one-way data transfer 116). If they do not match, the following loop algorithm may be employed.

The Send Node 107 recalculates the status report 118, hash number 102, and double hash number 103 by running through a sequence of known hypothetical errors in data transfer, comparing each new recalculated value of double hash number 103 with the hash number 104 received from the Hash Feedback Node 109 until a match is found, or until all known error conditions are exhausted. A looping algorithm used here may be designed to create the status request for the most commonly encountered states first, typically starting with the no-error state. The hash comparison 115 checks for all known possible status conditions including absence of errors, known errors, unknown errors, and other known possible states. Exhaustion of all known error states without a match between the double hash numbers 103 and 104 may indicate some unknown fundamental breakdown in the one-way data transfer system and may raise an alarm.

In addition, if the Send Node 107 initiates a verification request process 112 but fails to receive a double hash response 104 from the Hash Feedback Node 109 within a user-configurable time interval, the feedback verification process may be designed to time out and raise an alarm. As described earlier, the Hash Feedback Node 109 may be configured to have a limited communication channel capacity, and therefore may be configured to only operate for short predefined time intervals (e.g., one-second intervals) to mitigate the possible threat of a reverse-direction covert channel. In that case, the timeout configuration of the Send Node 107 is necessarily tuned to the channel capacity limits of Hash Feedback Node 109.

In some configurations, the timing of the processes described above and in FIG. 5 may be randomized to prevent potential risk of covert channel being created through the Hash Feedback Node 109 by, for example, time-series modulation of the messages through the Node 109. This randomization can be achieved by introducing arbitrary time delay in any or all of the processes involved in the data verification shown in FIG. 5. For example, instead of predefined periodic time intervals, the Send Node 107 may initiate the verification request process 112 and send the Feedback Verification Request Message 117 to the Receive Node 108 at random time intervals.

The present invention seeks to provide a further refined alternative data verification or acknowledgment mechanism for a one-way data transfer system.

It is an object of the present invention to provide a secure acknowledgment device for relaying acknowledgment messages from a Receive Node to a Send Node without compromising the security of the one-way data transfer system.

It is also an object of the present invention to provide a secure communication channel that strictly enforces unidirectionality of data flow passing through the channel, but at the same time, includes interfaces for bi-directional communications with other nodes.

Other objects and advantages of the present invention will become apparent from the following description.

SUMMARY OF THE INVENTION

It has now been found that the above and related objects of the present invention are obtained in the form of a secure acknowledgment device for one-way data transfer system.

More particularly, the present invention relates to an apparatus for relaying a hashed message from a first node to a second node, comprising an inlet interface for receiving a message from the first node, a hash number calculator for hashing the message from the inlet interface, an outlet interface for sending the hashed message to the second node, a first one-way data link for unidirectional transfer from the inlet interface to the hash number calculator, and a second one-way data link for unidirectional transfer from the hash number calculator to the outlet interface.

In at least one embodiment, the first node is a receive node; the second node is a send node; and the message comprises an acknowledgment message relating to receipt of data from the send node by the receive node via a third one-way data link.

The present invention is also directed to a data transfer system comprising a send node, a receive node, a first one-way data link for unidirectional transfer from the send node to the receive node, and a secure acknowledgment device for relaying a hashed acknowledgment message from the receive node to the send node, wherein the device comprises an inlet interface for receiving from the receive node an acknowledgment message relating to receipt of data from the send node by the receive node via the first one-way data link, a hash number calculator for hashing the acknowledgment message from the inlet interface, an outlet interface for sending the hashed acknowledgment message to the send node, a second one-way data link for unidirectional transfer from the inlet interface to the hash number calculator, and a third one-way data link for unidirectional transfer from the hash number calculator to the outlet interface.

The present invention is also directed to a data transfer system comprising a send server communicatively coupled to a data source platform, a receive server communicatively coupled to a data destination platform, a first one-way data link for unidirectional transfer from the send server to the receive server, and a secure acknowledgment device for relaying a hashed acknowledgment message from the data destination platform to the data source platform, wherein the secure acknowledgment device comprises an inlet interface for receiving from the data destination platform an acknowledgment message relating to receipt of data from the send server by the receive server via the first one-way data link, a hash number calculator for hashing the acknowledgment message from the inlet interface, an outlet interface for sending the hashed acknowledgment message to the data source platform, a second one-way data link for unidirectional transfer from the inlet interface to the hash number calculator, and a third one-way data link for unidirectional transfer from the hash number calculator to the outlet interface.

The present invention also relates to an apparatus for comparing hashed messages, comprising an inlet interface for receiving a message from a first node, a first hash number calculator for hashing the message from the inlet interface, an outlet interface for receiving the hashed message from the first hash number calculator and communicating with a second node, a first one-way data link for unidirectional transfer from the inlet interface to the first hash number calculator, and a second one-way data link for unidirectional transfer from the first hash number calculator to the outlet interface, wherein the outlet interface comprises a second hash number calculator for hashing an expected message from the second node, and a comparator for comparing the hashed message from the first hash number calculator with the hashed expected message from the second hash number calculator and sending the result of the comparison to the second node.

In at least one embodiment, the first node is a receive node; the second node is a send node; and the message comprises an acknowledgment message relating to receipt of data from the send node by the receive node via a third one-way data link.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE PREFERRED EMBODIMENTS

Figure 1:
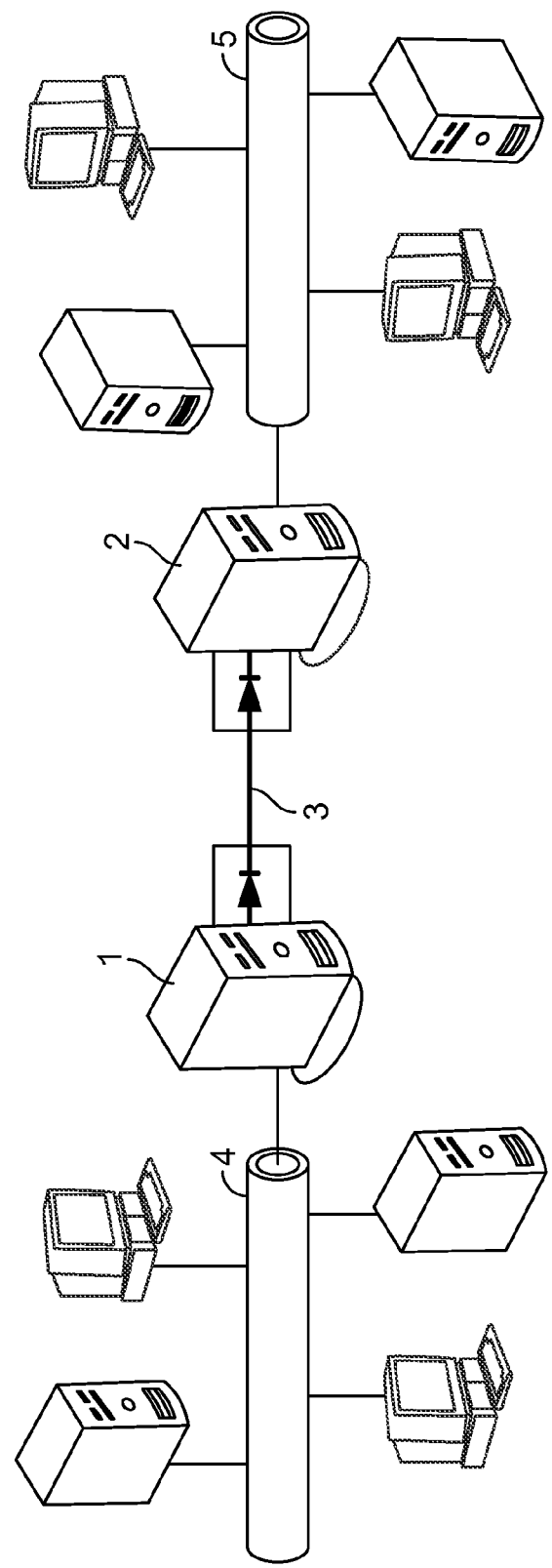
FIG. 1 schematically illustrates an example of a one-way data transfer system based on a one-way data link.
Figure 2:
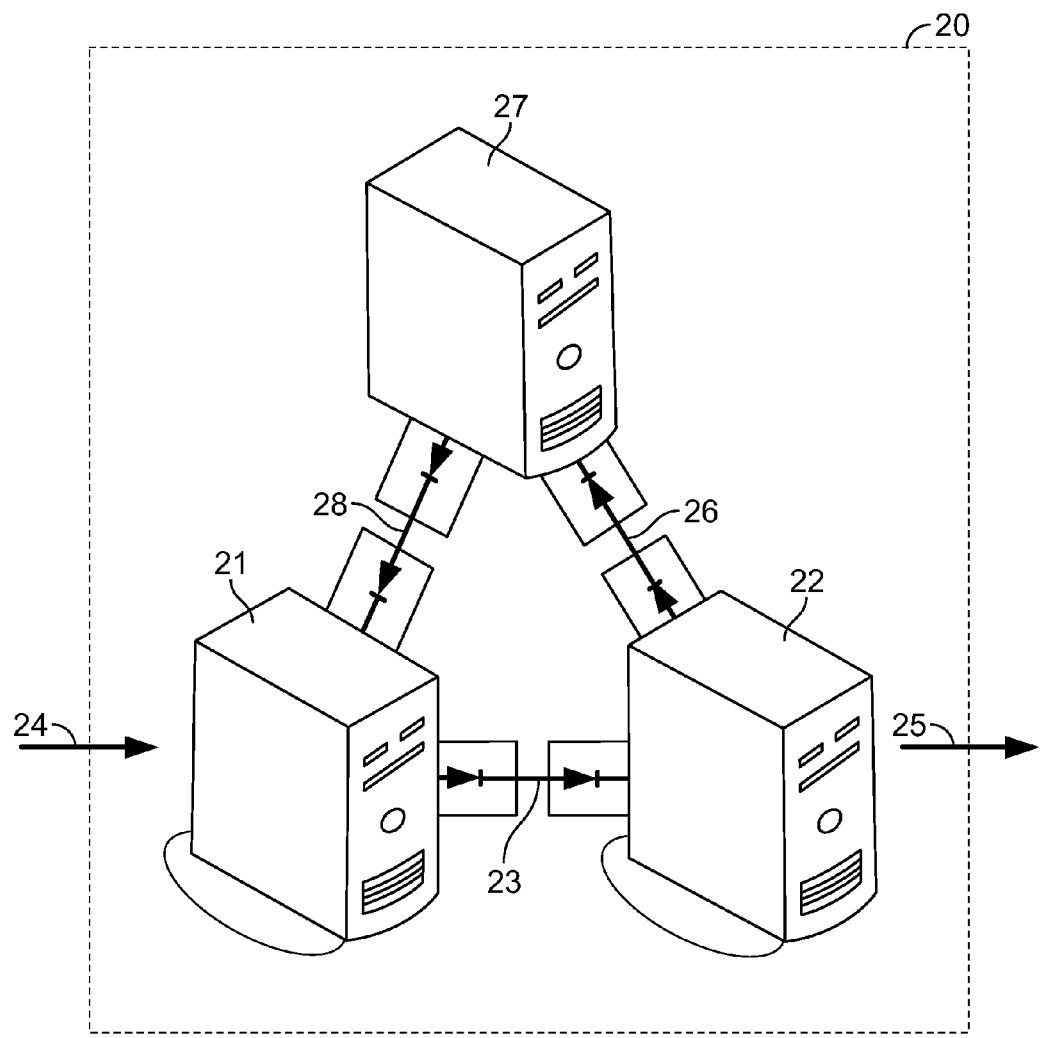
FIG. 2 is a schematic diagram of an exemplary one-way data transfer system with built-in data verification mechanism as described in the '867 patent.
Figure 3:
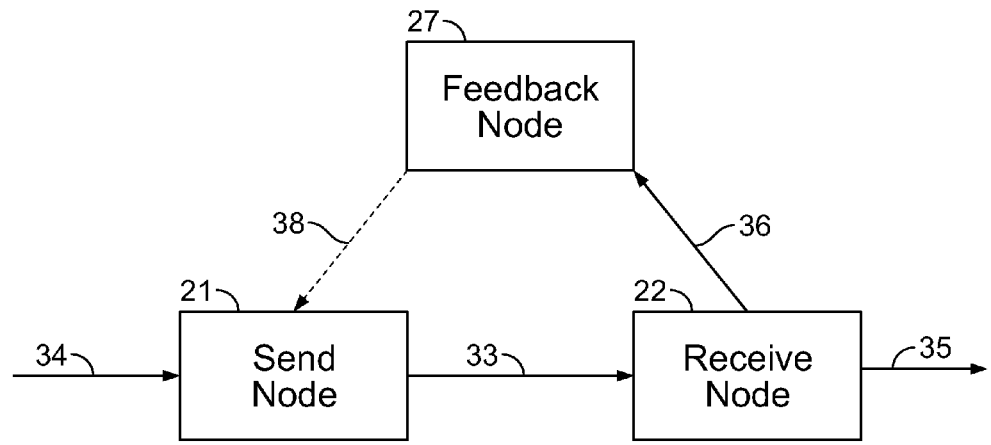
FIG. 3 is a functional block diagram for the one-way data transfer system shown in FIG. 2 for unidirectional data flow from the Send Node to the Receive Node.
Figure 4:
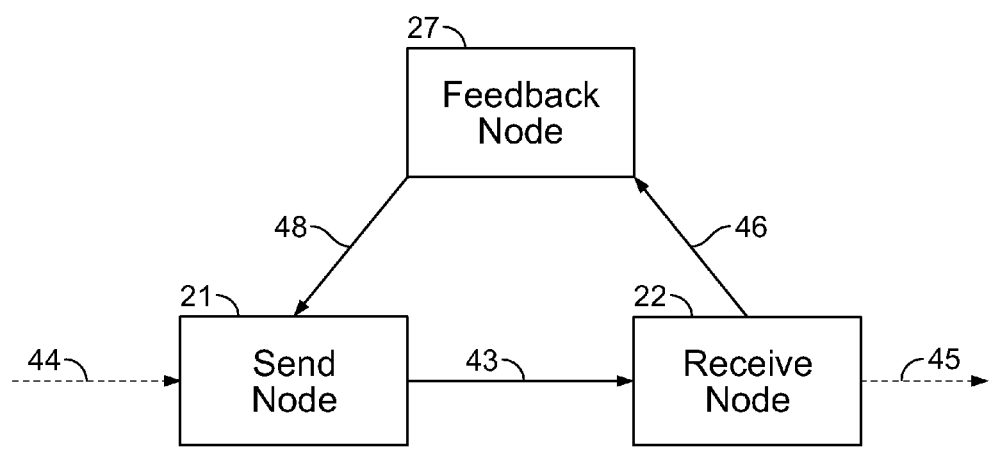
FIG. 4 is a functional block diagram for the one-way data transfer system shown in FIG. 2 for unidirectional flow of data verification information from the Receive Node to the dedicated Feedback Node and from the dedicated Feedback Node to the Send Node.
Figure 5:
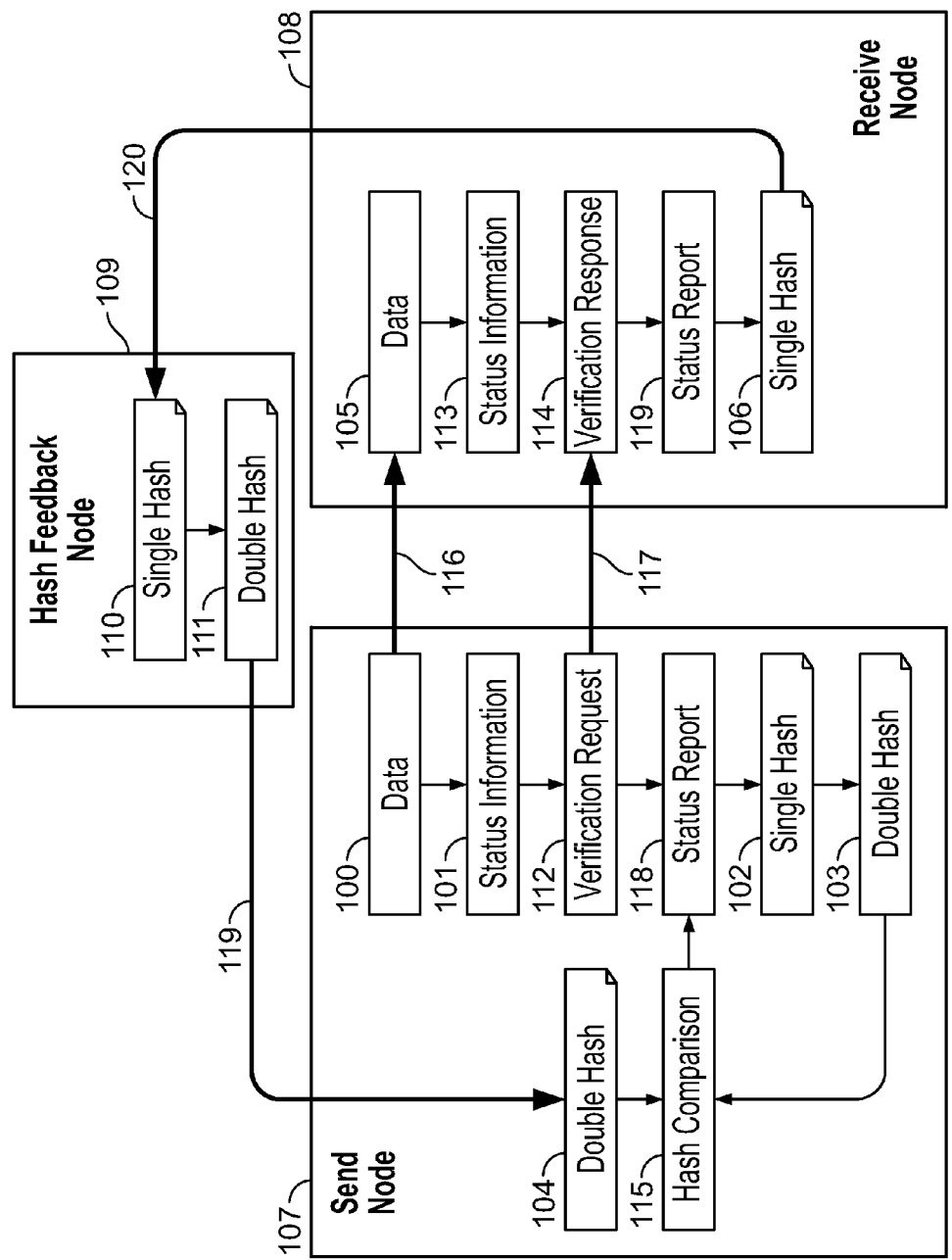
FIG. 5 is another functional block diagram containing flow charts for the one-way data transfer system shown in FIG. 2.
Figure 6:
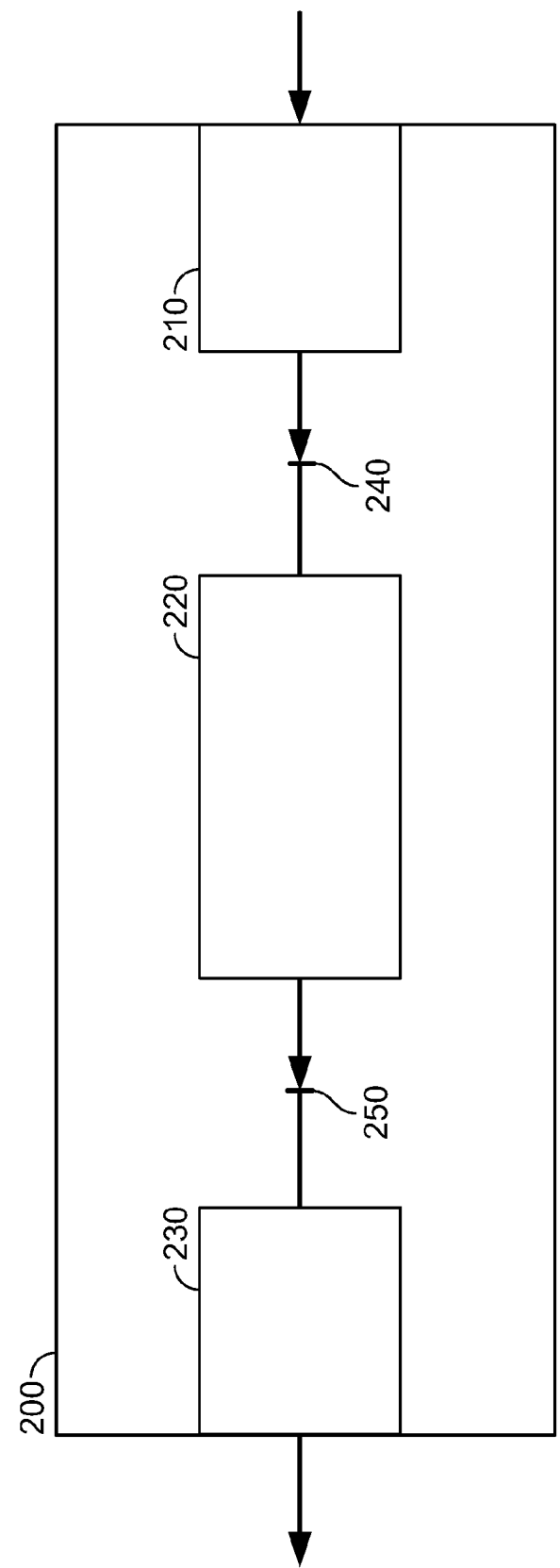
FIG. 6 is a schematic diagram of an embodiment of the present invention.

Illustrated in FIG. 6 is a schematic diagram of an exemplary embodiment of the present invention in the form of a secure acknowledgment device 200, which may be used as an alternative, further refined substitute for the Feedback Node 27, 109 of the '867 patent described above. The device 200 comprises an inlet interface module 210 for receiving a message from a first node (e.g., from a Receive Node), a hash number calculator 220 for computing a hash number corresponding to the message (i.e., hashing the message), an outlet interface module 230 for sending the hashed message to a second node (e.g., to a Send Node), a first one-way data link 240 for unidirectional transfer from the inlet interface module 210 to the hash number calculator 220, and a second one-way data link 250 for unidirectional transfer from the hash number calculator 220 to the outlet interface module 230. The first and second one-way data links 240 and 250 can be of any type of data transfer conduit that is capable of strictly enforcing unidirectional data flow, and each of them may be implemented in hardware or software or combination thereof.

The hash number calculator 220 may use an advanced hash algorithm, such as MD5 or Secure Hash Algorithm (SHA), for hashing the message received from the first node via the inlet interface module 210 and the first one-way data link 240. As shown in FIG. 6, the hash number calculator 220 is completely isolated by the first and second one-way data links 240 and 250 and their hardware-enforced unidirectionality of data flow. In view of this feature, the secure acknowledgment device 200 is a one-way data transfer device (even if, as discussed below, its interfaces 210, 230 may allow bidirectional communications) and is also called Application Hash Acknowledgment Diode (AHAD). The hash number calculator 220 may be configurable, or, alternatively, may be hard-coded into the CPU module using methods that are non-configurable after initial manufacturing stage.

In some embodiments of the present invention, unlike the Feedback Node 27, 109 of the '867 patent described above (see FIGS. 2-5), which is connected to the Receive Node 22 by one-way data link 26, 120 and also connected to the Send Node 21 by one-way data link 28, 119, the secure acknowledgment device 200 shown in FIG. 6 may be implemented with interface(s) for bidirectional communications with one or each of the first and second nodes. One or each of the inlet interface module 210 and the outlet interface module 230 may comprise an interface for bidirectional communication and may be implemented in accordance with various interface standards. For example, one or each of the inlet interface module 210 and the outlet interface module 230 may comprise a Universal Serial Bus (USB) connector (e.g., USB 1.1, or USB 2.0) for coupling to the USB in a node/computing platform. Alternatively, one or each of the inlet interface module 210 and the outlet interface module 230 may comprise a specially configured Peripheral Component Interconnect (PCI) card having PCI interface for coupling to the PCI bus in a node/computing platform. Other possible types of interface and interface standards that may be utilized in the interface modules 210, 230 include serial port connectors based on RS-232 standard and FireWire connectors (e.g., FireWire 400, or FireWire 800 connectors) based on IEEE 1394 standard. These connectors can be plugged into corresponding standard sockets in the host computers to access data bus in the host computers.

In another embodiments of the present invention, one or each of the inlet interface module 210 and the outlet interface module 230 of the device 200 may comprise an interface for one-way data link.

In some embodiments of the present invention, the device 200 may be designed to accept only short, fixed-length messages through the inlet interface module 210 and the first one-way data link 240, hash them using an advanced hash algorithm such as MD5 or SHA in the hash number calculator 220, and transmit the hashed messages through the second one-way data link 250 and the outlet interface module 230. The forms of the fixed-length message that are acceptable to the device 200 may include (framed) binary, arbitrary ASCII strings, ASCII hex characters, and/or a hash number. The length of the message corresponds to the hash number length produced by the specific hash algorithm used in the hash number calculator 220. Since all messages passing through the device 200 are restricted to have short, fixed length, and must be hashed in the process, no executable software or no data in intelligible form can pass through the device 200 from the first node to the second node. Accordingly, the secure acknowledgment device 200 could provide a secure communication channel for relaying acknowledgment messages from a Receive Node to a Send Node of a one-way data transfer system without compromising the security of the Receive Node.

Figure 7:
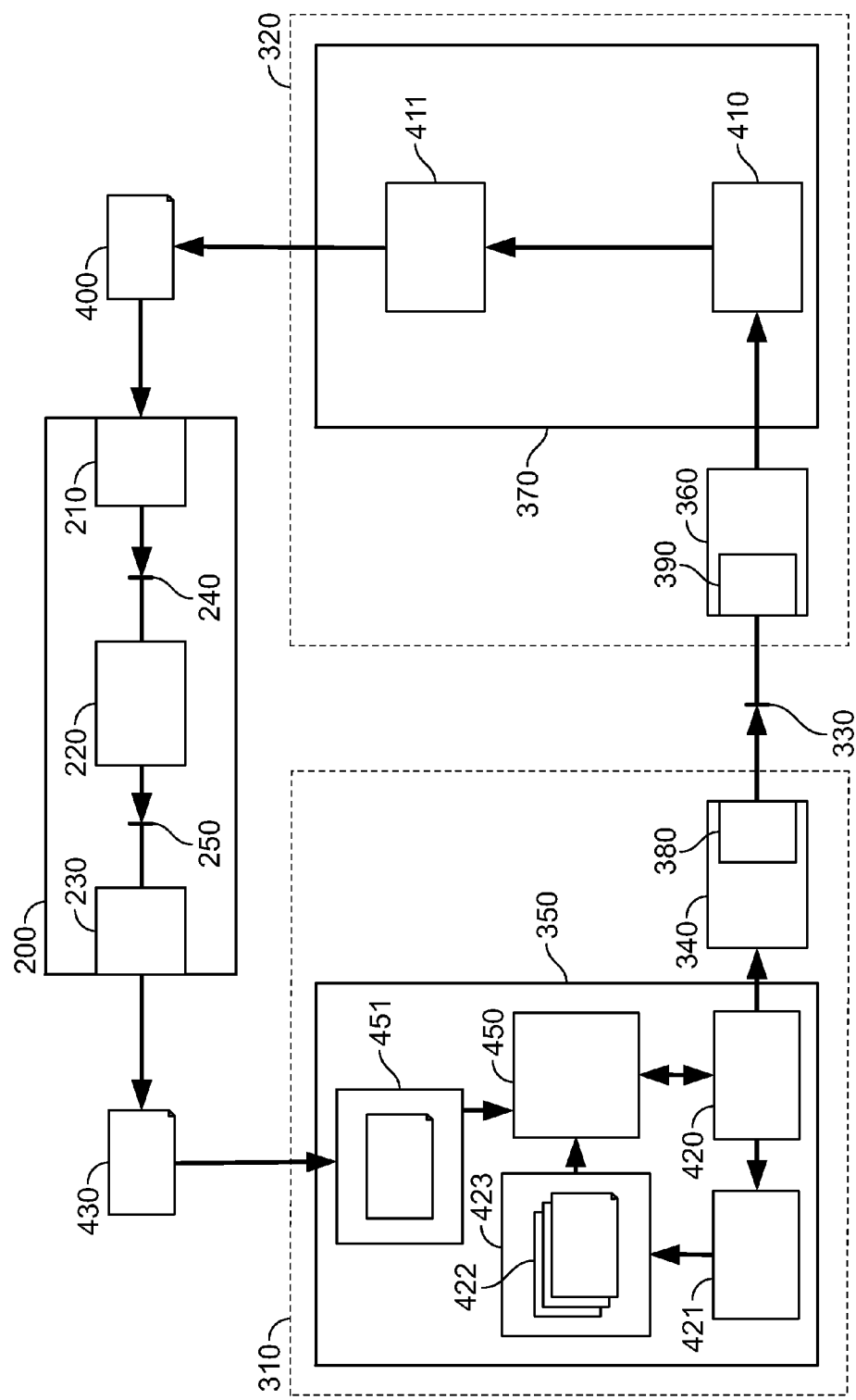
FIG. 7 is a schematic diagram of an exemplary one-way data transfer system including the secure acknowledgment device shown in FIG. 9.

The schematic diagram in FIG. 7 illustrates an example of how the secure acknowledgment device 200 of FIG. 6 may be deployed in a one-way data transfer system 300 as a secure communication channel for relaying acknowledgment messages from a Receive Node 320 to a Send Node 310. In the exemplary embodiment shown in FIG. 7, the Send Node 310 comprises separate but interconnected send server 340 and data source platform 350. Likewise, the Receive Node 320 comprises separate but interconnected receive server 360 and data destination platform 370. The send server 340 hosts a send interface 380 to one-way data link 330, while the receive server 360 hosts a receive interface 390 to the one-way data link 330. The data source platform 350 transmits data to the send server 340 to be transferred across the one-way data link 330. Upon receipt of the data from the one-way data link 330, the receive server 360 transfers the received data to the data destination platform 370. In alternative embodiments of the present invention, the send server 340 and data source platform 350 of the Send Node 310 may be placed within a single node unit, and likewise, the receive server 360 and data destination platform 370 of the Receive Node 320 may be placed within a single node unit. In another alternative embodiments of the present invention, the send server 340 and data source platform 350 of the Send Node 310 may be part of a network, and likewise, the receive server 360 and data destination platform 370 may be part of another network.

In an exemplary embodiment of the present invention, each data message transferred from the Send Node 310 to the Receive Node 320 across the one-way data link 330 may trigger generation of a corresponding acknowledgment message 400 by the Receive Node 320. In alternative embodiments, messages transferred through the one-way data link 330 may or may not require acknowledgment from the Receive Node 320, depending, for example, on the protocols of source and destination software applications 420, 410 installed in the data source and data destination platforms 350, 370, respectively. In this case, the messages requiring acknowledgment from the Receive Node 320 may carry a predefined unique message identifier or transaction number that can be recognized by the source software application 420 and the destination software application 410 to trigger the acknowledgment process.

For the embodiments of the present invention involving the source software application 420 in the data source platform 350 of the Send Node 310 and the destination software application 410 in the data destination platform 370 of the Receive Node 320, an application programming interface (API) function library or a suitable processor/circuitry 450, 411 may be installed in each of the source and destination platforms 350, 370 to provide the functional interface between the secure acknowledgment device 200 and the source and destination software applications 420, 410, respectively.

When the Receive Node 320 receives a data message requiring acknowledgment through the one-way data link 330, the destination software application 410 in the data destination platform 370 may generate a response (return) code, and provide the return code and the message identifier of the data message to the API function library 411 as function arguments. Upon receiving the function arguments from the destination software application 410, the API function library 411 in the data destination platform 370 generates a hashed acknowledgment message (e.g., hashed return code) 400 and sends it to the inlet interface module 210 of the secure acknowledgment device 200. The hashed acknowledgment message 400 may be in the form of a short, fixed-length hash number, which is recognizable only by the destination software application 410 in the data destination platform 370 and a source software application 420 in the data source platform 350.

When passing through the device 200, the hashed acknowledgment message 400 is further hashed by the hash number calculator 220, and then sent from the outlet interface module 230 to the Send Node 310 in the form of a double-hashed acknowledgment message 430. The double-hashed acknowledgment message 430 may not be intelligible or readily recognizable to any actors or processes other than the destination software application 410 in the data destination platform 370 and the source software application 420 in the data source platform 350.

In an exemplary embodiment of the present invention, the set of acknowledgment messages most likely to be generated by the destination software application 410 in response to receipt of data messages through the one-way data link 330 are known to the source software application 420 and may be rendered in the data source platform 350 as a static library. For example, the expected acknowledgment messages may include acknowledgment of success of data transfer or responses relating to error conditions commonly encountered in one-way data transfers. In alternative embodiments, the set of expected acknowledgment messages may be hard-coded within the source software application 420. The expected acknowledgment messages rendered in the data source platform 350 may be further double-hashed by a double-hash number calculator 421 and the corresponding double hash values (i.e., double-hashed expected acknowledgment messages) 422 may be stored in a static library 423 in the data source platform 350.

The double-hashed acknowledgment message 430 sent from the outlet interface module 230 of the secure acknowledgment device 200 may be stored in a message queue 451 in the data source platform 350. A comparator or comparison engine 450 (e.g., API function library) in the platform 350 reads the received double-hashed acknowledgment message 430 from the queue 451 and compares it with the expected responses (i.e., double-hashed expected acknowledgment messages) 422 stored in the static library 423. If the double-hashed acknowledgment message 430 matches with an expected response, then the transaction state of data transfer across the one-way data link 330 is known. If no match is found, then the acknowledgment indicates an unknown error.

The acknowledgment message 400 may be processed and transmitted to the Send Node 310 by the secure acknowledgment device 200 before the next data message is sent by the Send Node 310 through the one-way data link 330. To facilitate rapid exchanges of data and acknowledgment messages between the Send Node 310 and the Receive Node 320, the Send Node 310 (e.g., the source software application 420) may take the step of preparing to receive the acknowledgment messages 400 via the device 200 before it sends a data message to the Receive Node 320.

Figure 8:
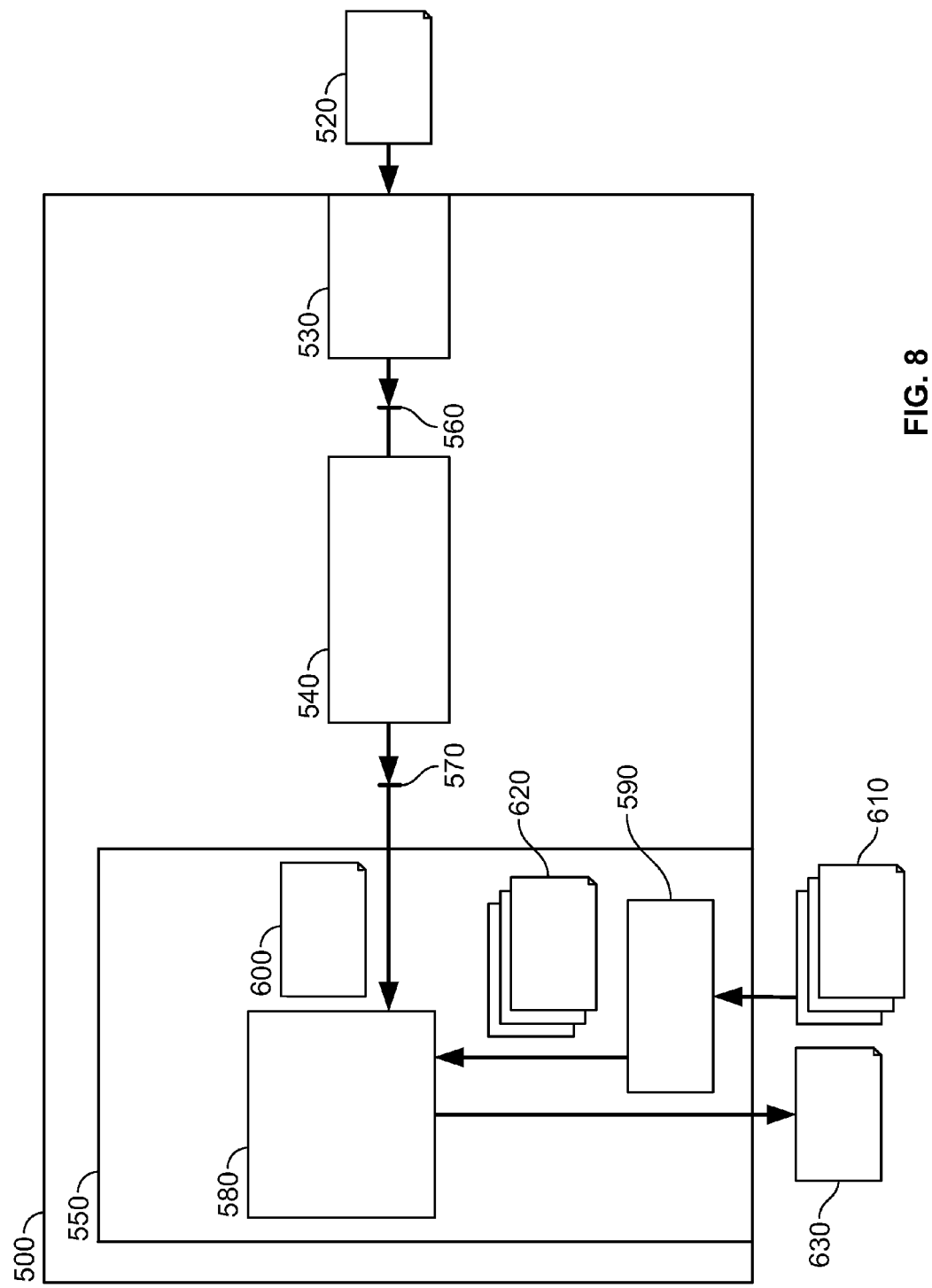
FIG. 8 is a schematic diagram of another embodiment of the present invention.

Illustrated in FIG. 8 is a schematic diagram for another embodiment of the present invention, wherein a comparison engine or comparator for comparing an acknowledgment message from a Receive Node with an expected value stored in a Send Node of a one-way data transfer system is incorporated within a secure acknowledgment device 500 itself. The device 500 comprises an inlet network interface 530, a first hash number calculator 540, an outlet server network interface 550, a first one-way data link 560 for unidirectional transfer from the inlet network interface 530 to the first hash number calculator 540, and a second one-way data link 570 for unidirectional transfer from the first hash number calculator 540 to the outlet server network interface 550. The outlet server network interface 550 may comprise a comparison engine 580 and a second hash number calculator 590.

An acknowledgment message 520 (e.g., from a Receive Node in a one-way data transfer system) may be input into the inlet interface module 530 of the secure acknowledgment device 500. The acknowledgment message passes through the first one-way data link 560, hashed by the first hash number calculator 540, and then its hashed value 600 passes through another second one-way data link 570 to reach the outlet server network interface 550.

The second hash number calculator 590 receives the set of expected acknowledgment messages 610 (e.g., from a Send Node in the one-way data transfer system) and hash them to create the hashed expected acknowledgment messages 620. The outlet server network interface 580 may call for the set of expected acknowledgment messages 610 from another node and hash them every time they are needed (e.g., when the hashed acknowledgment message 600 has been or is about to be created). Alternatively, it may do that once and store the hashed expected acknowledgment messages 620 within the interface 610. The hashed expected acknowledgment messages 620 may be rendered in the outlet server network interface 550 as a static library accessible by the comparison engine 580. The comparison engine 580 reads the hashed acknowledgment message 600, compares it with the hashed expected messages 620, and sends out the result 630 of the comparison (e.g., to the Send Node of the one-way data transfer system). In this way, this alternative embodiment of the present invention provides an integrated module or device for securely performing the feedback and verification functions.

While the acknowledgment or data verification scheme using hash algorithm is used here to illustrate embodiments of the present invention, those skilled in the art will appreciate that the present invention does not depend on the choice of particular type of data verification scheme or algorithm, and that the choice of data verification scheme and algorithm will depend on the customer's needs such as the computer hardware/software requirements, the required level of sophistication for data verification, etc.

It is to be understood that while certain forms of the present invention have been illustrated and described herein, it is not to be limited to the specific forms or arrangement of parts described and shown. The present embodiments are therefore to be considered in all respects as illustrative and not restrictive. Accordingly, the spirit and scope of the present invention is to be construed broadly.

What is claimed is:

1. An acknowledgement apparatus, comprising:
   an inlet interface for receiving a message from a first node;
   a first hash number calculator for hashing the message from the inlet interface;
   an outlet interface;
   a first one-way data link for unidirectional transfer from the inlet interface to the first hash number calculator; and
   a second one-way data link for unidirectional transfer from the first hash number calculator to the outlet interface;
   wherein the outlet interface is coupled to a second node and comprises:
      a second hash calculator for hashing a second message corresponding to the first message received from the second node; and
      a comparison engine having a first input coupled to the second one way link to receive the hashed message from the first hash number calculator, a second input coupled to the second hash calculator to receive the hashed second message and an output coupled to the second node, the comparison engine configured to compare the hashed message and the hashed second message and to forward the results of the comparison on the output.

2. The apparatus of claim 1, wherein: the first node is a receive node; the second node is a send node; and the message comprises an acknowledgment message relating to receipt of data from the send node by the receive node via a third one-way data link.

3. The apparatus of claim 1, wherein the message has a fixed length.

4. The apparatus of claim 1, wherein the inlet interface comprises an interface for unidirectional communication from the first node.

5. The apparatus of claim 1, wherein the inlet interface comprises an interface for bidirectional communication with the first node.

6. The apparatus of claim 1, wherein the outlet interface comprises an interface for bidirectional communication with the second node.

7. The apparatus of claim 1, wherein the inlet interface comprises a USB interface.

8. The apparatus of claim 1, wherein the outlet interface comprises a USB interface.

9. The apparatus of claim 1, wherein the first and second hash number calculators use MD5 for hashing the message.

10. The apparatus of claim 1, wherein the first and second hash number calculators use SHA for hashing the message.

11. The apparatus of claim 1, wherein the message is a hashed response from the first node.

12. A data transfer system comprising:
a send node;
a receive node;
a first one-way data link for unidirectional transfer from the send node to the receive node; and
a secure acknowledgment device,
wherein the secure acknowledgment device comprises:
an inlet interface for receiving from the receive node an acknowledgment message relating to receipt of data from the send node by the receive node via the first one-way data link;
a first hash number calculator for hashing the acknowledgment message from the inlet interface;
an outlet interface;
a second one-way data link for unidirectional transfer from the inlet interface to the hash number calculator; and
a third one-way data link for unidirectional transfer from the hash number calculator to the outlet interface;
wherein the outlet interface is coupled to the send node and comprises:
a second hash calculator for hashing a second message corresponding to the first message, the second message received from the send node; and
a comparison engine having a first input coupled to the third one way link to receive the hashed message from the first hash number calculator, a second input coupled to the second hash calculator to receive the hashed second message and an output coupled to the send node, the comparison engine configured to compare the hashed message and the hashed second message and to forward the results of the comparison on the output.

13. The system of claim 12, wherein the acknowledgment message has a fixed length.

14. The system of claim 12, wherein the inlet interface comprises an interface for unidirectional communication from the receive node.

15. The system of claim 12, wherein the inlet interface comprises an interface for bidirectional communication with the receive node.

16. The system of claim 12, wherein the outlet interface comprises an interface for bidirectional communication with the send node.

17. The system of claim 12, wherein the inlet interface comprises a USB interface.

18. The system of claim 12, wherein the outlet interface comprises a USB interface.

19. The system of claim 12, wherein the first and second hash number calculators use MD5 for hashing the acknowledgment message.

20. The system of claim 12, wherein the first hash number calculators use SHA for hashing the acknowledgment message.

21. The system of claim 12, wherein the acknowledgment message comprises a hashed response from the receive node.

22. The system of claim 12, wherein at least one of the first one-way data link, the second one-way data link and the third one-way data link is implemented in hardware.

23. The system of claim 22, wherein the at least one of the first one-way data link, the second one-way data link and the third one-way data link comprises an optical fiber.

24. The system of claim 12, wherein at least one of the first one-way data link, the second one-way data link and the third one-way data link is implemented in software.

25. The system of claim 24, wherein the at least one of the first one-way data link, the second one-way data link and the third one-way data link comprises a specially configured IP architecture using firewalls.

26. A data transfer system comprising:
a send server communicatively coupled to a data source platform;
a receive server communicatively coupled to a data destination platform;
a first one-way data link for unidirectional transfer from the send server to the receive server; and
a secure acknowledgment device,
wherein the secure acknowledgment device comprises:
an inlet interface for receiving from the data destination platform an acknowledgment message relating to receipt of data from the send server by the receive server via the first one-way data link;
a first hash number calculator for hashing the acknowledgment message from the inlet interface;
an outlet interface;
a second one-way data link for unidirectional transfer from the inlet interface to the hash number calculator; and
a third one-way data link for unidirectional transfer from the hash number calculator to the outlet interface,
wherein the outlet interface is coupled to the send node server and comprises:
a second hash calculator for hashing a second message corresponding to the first message, the second message received from the send server; and
a comparison engine having a first input coupled to the third one way link to receive the hashed message from the first hash number calculator, a second input coupled to the second hash calculator to receive the hashed second message and an output coupled to the send server, the comparison engine configured to compare the hashed message and the hashed second message and to forward the results of the comparison on the output.

27. The system of claim 26, wherein the acknowledgment message has a fixed length.

28. The system of claim 26, wherein the inlet interface comprises an interface for unidirectional communication from the data destination platform.

29. The system of claim 26, wherein the inlet interface comprises an interface for bidirectional communication with the data destination platform.

30. The system of claim 26, wherein the outlet interface comprises an interface for bidirectional communication with the data source platform.

31. The system of claim 26, wherein the inlet interface comprises a USB interface.

32. The system of claim 26, wherein the outlet interface comprises a USB interface.

33. The system of claim 26, wherein the first and second hash number calculators use MD5 for hashing the acknowledgment message.

34. The system of claim 26, wherein the first and second hash number calculators use SHA for hashing the acknowledgment message.

35. The system of claim 26, wherein the acknowledgment message comprises a hashed response from the data destination platform.

36. The system of claim 26, wherein the send server and the data source platform reside in a single node.

37. The system of claim 26, wherein the receive server and the data destination platform reside in a single node.

38. The system of claim 26, wherein at least one of the first one-way data link, the second one-way data link and the third one-way data link is implemented in hardware.

39. The system of claim 38, wherein the at least one of the first one-way data link, the second one-way data link and the third one-way data link comprises an optical fiber.

40. The system of claim 26, wherein at least one of the first one-way data link, the second one-way data link and the third one-way data link is implemented in software.

41. The system of claim 40, wherein the at least one of the first one-way data link, the second one-way data link and the third one-way data link comprises a specially configured IP architecture using firewalls.

42. An apparatus for comparing hashed messages, comprising:
 an inlet interface for receiving a message from a first node;
 a first hash number calculator for hashing the message from the inlet interface;
 an outlet interface for receiving the hashed message from the first hash number calculator and communicating with a second node;
 a first one-way data link for unidirectional transfer from the inlet interface to the first hash number calculator; and
 a second one-way data link for unidirectional transfer from the first hash number calculator to the outlet interface,
 wherein the outlet interface comprises:
  a second hash number calculator for hashing an expected message from the second node; and
  a comparator for comparing the hashed message from the first hash number calculator with the hashed expected message from the second hash number calculator, and for forwarding the results of the comparison to the second node.

43. The apparatus of claim 42, wherein: the first node is a receive node; the second node is a send node; and the message comprises an acknowledgment message relating to receipt of data from the send node by the receive node via a third one-way data link.

44. The apparatus of claim 42, wherein the message has a fixed length.

45. The apparatus of claim 42, wherein the inlet interface comprises an interface for unidirectional communication from the first node.

46. The apparatus of claim 42, wherein the inlet interface comprises an interface for bidirectional communication with the first node.

47. The apparatus of claim 42, wherein the inlet interface comprises a USB interface.

48. The apparatus of claim 42, wherein the outlet interface comprises a USB interface.

49. The apparatus of claim 42, wherein the first and second hash number calculators use MD5 for hashing the message and the expected message, respectively.

50. The apparatus of claim 42, wherein the first and second hash number calculators use SHA for hashing the message and the expected message, respectively.

* * * * *